US008860238B2

(12) United States Patent
Wiechers

(10) Patent No.: US 8,860,238 B2
(45) Date of Patent: Oct. 14, 2014

(54) METHOD AND DEVICE FOR HANDLING, IN PARTICULAR FOR REPAIRING OR REPLACING, BUSBARS ON WIND POWER PLANTS

(75) Inventor: Joerg Wiechers, Bilsen (DE)

(73) Assignee: FLYTEG GmbH & Co. KG, Hamburg (DE)

(*) Notice: Subject to any disclaimer, the term of this patent is extended or adjusted under 35 U.S.C. 154(b) by 0 days.

(21) Appl. No.: 13/810,374

(22) PCT Filed: Jun. 9, 2011

(86) PCT No.: PCT/EP2011/059596
§ 371 (c)(1),
(2), (4) Date: Feb. 27, 2013

(87) PCT Pub. No.: WO2012/007235
PCT Pub. Date: Jan. 19, 2012

(65) Prior Publication Data
US 2013/0170929 A1    Jul. 4, 2013

(30) Foreign Application Priority Data

Jul. 16, 2010   (DE) .......................... 10 2010 027 498

(51) Int. Cl.
| | | |
|---|---|---|
| *F03D 9/00* | (2006.01) | |
| *F03D 1/00* | (2006.01) | |
| *H02B 3/00* | (2006.01) | |
| *H02G 5/00* | (2006.01) | |
| *H02G 5/04* | (2006.01) | |
| *F03D 11/00* | (2006.01) | |
| *H02G 5/02* | (2006.01) | |

(52) U.S. Cl.
CPC ................. *H02G 5/04* (2013.01); *Y02E 10/722* (2013.01); *F03D 1/003* (2013.01); *H02B 3/00* (2013.01); *H02G 5/007* (2013.01); *F03D 11/0058* (2013.01); *H02G 5/025* (2013.01); *F05B 2230/80* (2013.01)
USPC ............................. 290/44; 290/55; 52/745.18

(58) Field of Classification Search
CPC ......... H02G 5/00; H02G 5/002; H02G 5/005; H02G 5/007; H02G 5/06; E04H 12/334; E04H 2012/006
USPC ........................ 290/44, 55; 414/222.01, 806; 52/745.18, 745.17; 29/428, 592, 888, 29/429, 525.01, 700, 738
See application file for complete search history.

(56) References Cited

U.S. PATENT DOCUMENTS

| | | | |
|---|---|---|---|
| 6,868,646 | B1* | 3/2005 | Perina ........................ 52/745.17 |
| 7,199,485 | B2* | 4/2007 | Wobben ........................ 290/55 |
| 2006/0233645 | A1 | 10/2006 | Wobben |
| 2011/0140446 | A1 | 6/2011 | Knoop |
| 2011/0221205 | A1 | 9/2011 | Haar et al. |

FOREIGN PATENT DOCUMENTS

| | | |
|---|---|---|
| DE | 10305689 A1 | 9/2004 |
| DE | 102008018790 A1 | 10/2009 |
| DE | 102008058129 A1 | 5/2010 |

* cited by examiner

*Primary Examiner* — Vanessa Girardi
(74) *Attorney, Agent, or Firm* — Bachman & LaPointe, P.C.

(57) ABSTRACT

A method for handling busbars on wind power plants in which a power connection between a generator device disposed in an upper region of the wind power plant and a substation located at a base area of the wind power plant consists of a plurality of busbar subregions each comprising a certain number of mutually interconnected busbars.

9 Claims, 5 Drawing Sheets

METHOD AND DEVICE FOR HANDLING, IN PARTICULAR FOR REPAIRING OR REPLACING, BUSBARS ON WIND POWER PLANTS

BACKGROUND OF THE INVENTION

The invention relates to a method for handling, in particular for repairing of replacing, busbars on wind power plants. The invention further relates to a method for handling, in particular for repairing or replacing, bus bars on wind power plants.

In the transmission of the power generated in a generator in the region of the top of a tower of a wind power plant into a substation arranged at the base of the wind power plant, a differentiation is basically made between two methods: In the first method, the power is transmitted via a cable from the generator to the substation. In the second method, the power transmission takes place by means of busbars. Here, for bridging the distance between the base region and the head of the tower of the wind power plant, usually a plurality of busbars are used, connected or respectively screwed to one another, which have, for example, a typical length of approximately 3 m.

The tower of a wind power plant generally consists of several tower segments arranged on top of one another, which are respectively constructed in a sleeve shape. During the manufacture of the wind power plant, in the second method for power transmission the busbars are already fixed to the inner wall of the respective tower segment during the manufacture of the tower segments, so that the busbars arranged or respectively fixed inside a tower segment form a busbar subregion. After the placing of the individual tower segments on one another in situ, the individual busbar subregions of the tower segments are electrically contacted or respectively coupled with one another by means of connection bars. The individual busbars of a busbar subregion are elastically fixed or respectively suspended within the tower segment by means of a fixing device, having a bracket, via an elastomer element, serving as intermediate element, in a bolt, which in turn is anchored in the wall of the tower segment.

On mounting and especially during the operation of the wind power plant, in the course of time, for example as a result of different thermal expansions between the tower of the wind power plant, consisting of steel, and the busbars, usually consisting of aluminium, mechanical stresses occur within a busbar subregion and between the individual busbar regions, which are to be balanced out through the elastic suspension of the busbars by the elastomer elements. Furthermore, as a result of the elastic suspension of the busbars via the elastomer elements, the weights of the individual busbars are partially transferred to the busbars respectively arranged beneath.

Owing to the special geometric construction of the busbars, it is not possible, without the risk of damage to individual busbars, to remove an individual busbar from a busbar subregion due to a necessary repair or a necessary replacement. Firstly, the connection bar arranged above the affected busbar subregion to the next busbar subregion must be disconnected. Only then can a replacement take place of the busbar which is to be repaired or respectively replaced by removing all busbars of the affected busbar subregion above the busbar which is to be repaired or respectively replaced. On re-mounting the busbars of a busbar subregion, the procedures are repeated in reverse sequence. Owing to the elastic suspension of the busbars and the mentioned stresses between the busbars and between the busbar subregions, on re-mounting of the busbars additional stresses are introduced into the busbar interconnection formed from the individual busbar subregions, which can previously damage the busbar interconnection. Moreover, during the repair or replacement, the busbars of the busbar above that which is to be repaired or respectively replaced are partially stressed by the weight of busbars arranged above, so that these settle by a certain distance and therefore if applicable the elastomers of the relevant busbars can be previously damaged, which if applicable can not be detected visually.

SUMMARY OF THE INVENTION

Proceeding from the presented prior art, the invention is based on the problem of further developing a method for handling, in particular for repairing of replacing, busbars on wind power plants such that a dismantling and mounting of individual busbars on a wind power plant is made possible, without additional stresses or respectively previous damage being introduced into the busbar interconnection composed of the busbars, or respectively that a simple replacement of busbars is made possible.

The invention is based here on the idea of at least partially equalizing the weight of at least one busbar, arranged directly above or respectively below in particular the busbar which is to be repaired or respectively replaced, by means of a relief arrangement by applying a tensile force to the relevant busbar. Thereby, the inherent stresses between the individual busbars of a busbar subregion are at least reduced, in the best case are completely eliminated, so that the busbars can be removed or respectively dismantled and subsequently mounted again in a stress-free manner.

Advantageous further developments of the method according to the invention and its device are indicated in the subclaims. All combinations of at least two of the features disclosed in the claims, in the description and/or in the figures fall within the scope of the invention.

In a preferred embodiment of the invention, it is proposed that the weights of all busbars of a busbar subregion, in which the busbar which is to be repaired or replaced is situated, are at least partially, preferably completely, equalized by means of the relief arrangement. Thereby, in particular after the re-mounting of the busbars of a busbar subregion has been completed, inherent stresses between the busbars in the busbar subregion are reliably prevented.

In a most especially preferred method, it is additionally proposed that in addition also the weights of those busbars of the busbar subregions are at least partially equalized which are situated beneath or respectively above the busbar subregion with the busbar which is to be repaired or respectively replaced. Thereby, the entire busbar interconnection between the generator and the substation at the foot of the wind power plant is arranged in a stress-free manner, so that any stresses which may be present in the busbar interconnection in the interim as a result of the operation of the wind power plant can be completely removed. Thereby, an undisturbed operation of the wind power plant in the region of the busbar interconnection, taking place over longer period, is made possible, because damage as a result of stresses between the busbars can be prevented.

Furthermore, it is most particularly preferred if at least one elastic fixing element, associated with the fixing device of the busbar which is to be repaired or respectively replaced, is replaced together with the relevant busbar. Thereby, possible future damage owing to a previously damaged elastomer element or respectively fixing element is prevented.

In order to ensure that during the dismantling of the busbars no further previous damage or respectively stresses can be introduced into the busbar interconnection, or respectively such stresses are prevented on re-mounting, in a further embodiment of the method according to the invention it is proposed that the equalizing of the weights of the busbars takes place by relieving the busbars from the direction of the generator device in the direction of the substation, by the weights of the busbars being equalized in succession, and that after completion of the repair or respectively replacement of the busbar, the weight loading of the busbars as a result of their own weight takes place from the direction of the substation in the direction of the generator device, by the busbars being brought out of operative connection in succession with the relief arrangement.

A preferred device for carrying out a method according to the invention comprises a relief arrangement, which is able to be connected with the fixing device of a busbar and which has at least one tensioning device, by which the weight of a busbar is able to be equalized.

In a first structural embodiment, which is suitable for the repair of individual busbars of a busbar subregion, provision is made that the relief arrangement is able to be secured on a fixing bolt for fixing the fixing device for the busbar.

In a preferred structural embodiment of the device, which is suitable in particular to arrange the entire busbar interconnection of a wind power plant in a weight-free manner, in order for example to eliminate inherent stresses of all busbars or respectively to enable a replacement of all elastomers or respectively fixing devices of the wind power plant, provision is made that the relief arrangement has at least one carrying means, which in particular is able to be secured on the upper region of the tower of the wind power plant, and that the at least one carrying means for a plurality of busbars, preferably for all busbars, respectively has at least one tensioning device for weight equalization, which is able to be connected with the fixing device of the busbar.

In order to prevent the introduction of transverse forces into the busbars, it is furthermore advantageous if the relief arrangement has two tensioning devices, able to be connected with the fixing device, for each busbar, and if the two tensioning devices are arranged symmetrically to the longitudinal axis of the busbar.

BRIEF DESCRIPTION OF THE DRAWINGS

Further advantages, features and details of the invention will emerge from the following description of preferred example embodiments and with the aid of the drawings. These show in.

Identical components or respectively components with the same function are given the same reference numbers in the figures.

DETAILED DESCRIPTION

Figure 1:
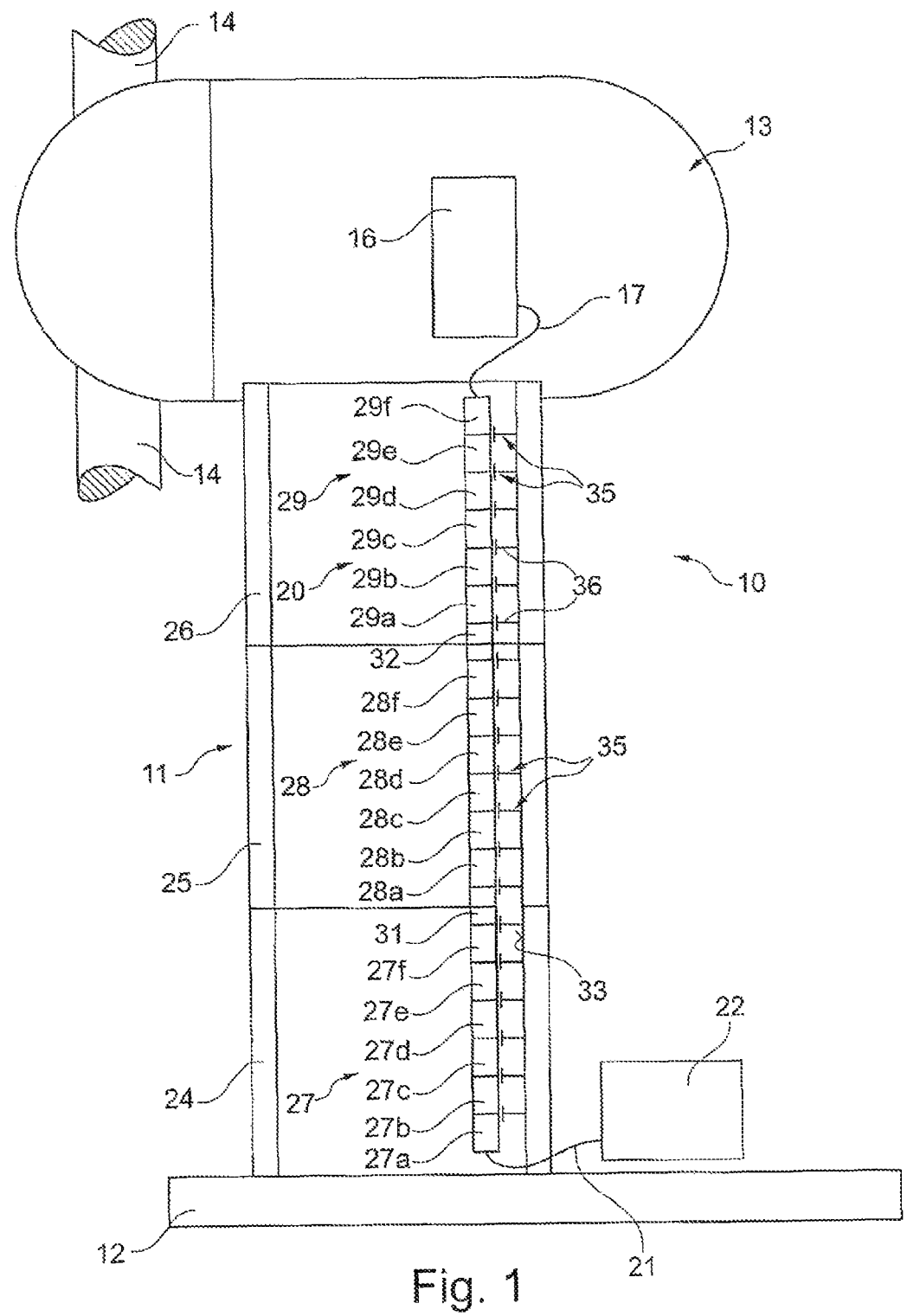
FIG. 1 a greatly simplified longitudinal section through a wind power plant.

In FIG. 1 the basic structure of a wind power plant 10 is illustrated in a greatly simplified manner. The wind power plant 10 has a tower 11, which is arranged on a base 12. At the top of the tower 11 a nacelle 13 is arranged, in which inter alia the rotor blades 14 are arranged in a rotatably movable manner. A generator 16 is situated within the nacelle 13. The generator 16 is coupled with an upper connecting line 17 or an upper connection with a busbar interconnection 20. The busbar interconnection 20 is arranged here in particular over the entire length or respectively height of the tower 11. In the region of the base 12 of the tower 11, the busbar interconnection 20 is connected by means of a further, lower connecting line 21 or respectively a lower connection with a substation 22.

The tower 11 consists for example of three respectively sleeve-like tower segments 24 to 26 arranged on top of one another. Such a tower segment 24 to 26 has here a typical length of approximately 20 m, so that the overall height of the tower 11 is approximately 60 m. The busbar interconnection 20 is already arranged or respectively fixed during the manufacture of the tower segments 24 to 26 within the individual tower segments 24 to 26. For this, the busbar interconnection 20 within each tower segment 24 to 26 consists of a busbar subregion 27 to 29. Each busbar subregion 27 to 29 consists in turn of several busbars 27a to 27f, 28a to 28f and 29a to 29f, for example approximately 3 m in length.

Between the individual busbar subregions 27 and 28 the respectively uppermost busbars 27f and 28f are connected in an electrically conductive manner with the respectively lower busbars 28a and 29a of the busbar subregions 28 and 29 arranged above, by means of connection bars 31, 32.

Figure 2:
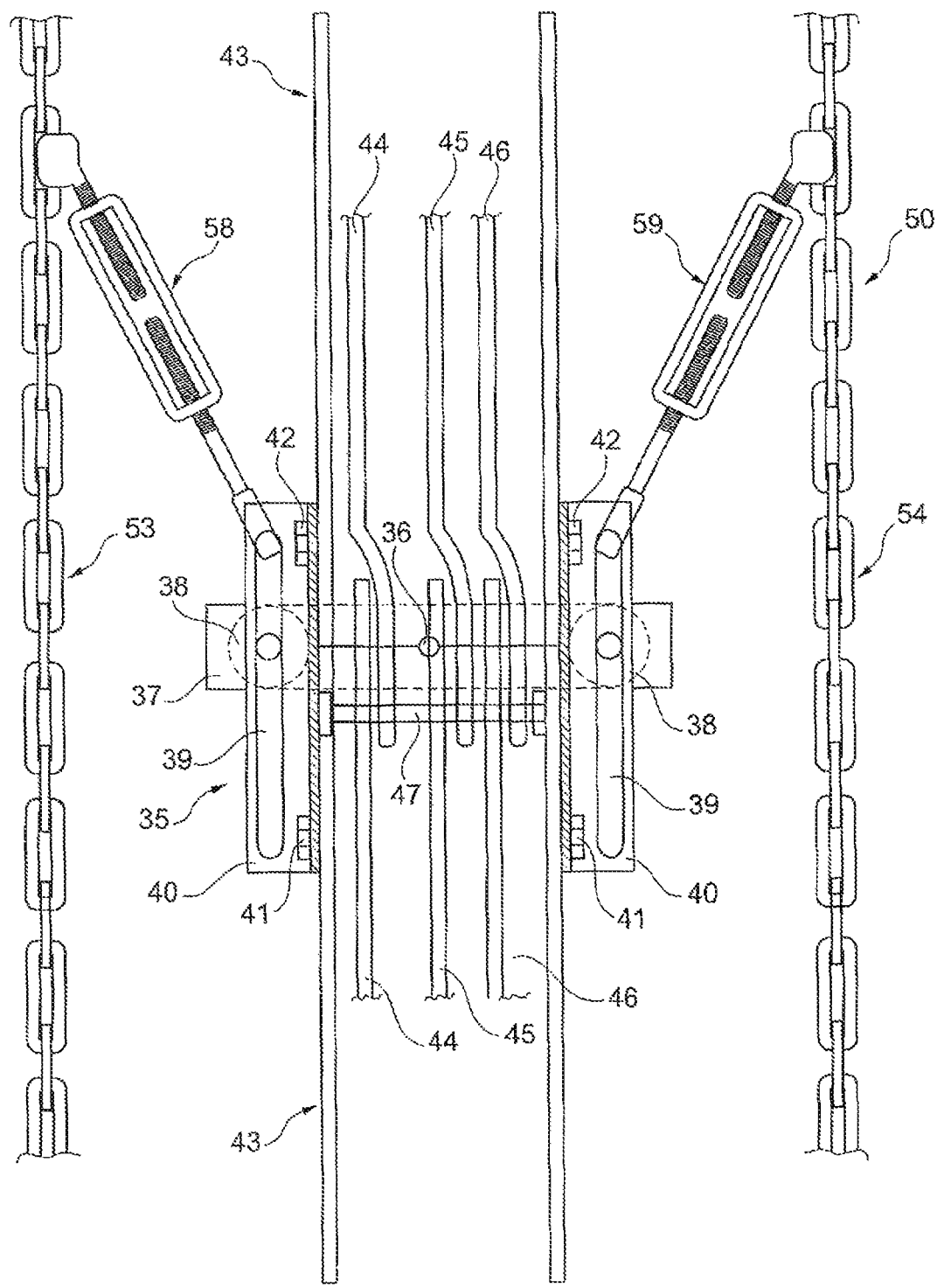
FIG. 2 a front view, partially in section, in the region of the connecting site of two busbars within the wind power plant according to FIG. 1 with a first relief arrangement according to the invention, FIG. 3 the first relief arrangement according to the invention, in simplified representation, FIG. 4 a side view onto a second relief arrangement according to the invention, and FIG. 5 a front view onto the second relief arrangement according to the invention, in accordance with FIG. 4.

Respectively two successive busbars 27a to 27f, 28a to 28f and 29a to 29f are fixed to the inner wall 33 of the tower 11 by means of a fixing device 35 which can be seen in FIG. 2. For this, a bracket bolt 36 is securely anchored on the inner wall 33 of the tower 11, which bolt carries the actual fixing device 35. The fixing device 35 has a bracket angle 37 arranged transversely to the busbars 27a to 27f, 28a to 28f and 29a to 29f, which bracket angle carries respectively a coupling element, constructed as elastomer element 38, on both sides to the busbars 28a to 27f, 28a to 28f and 29a to 29f. The elastomer element 38, constructed in particular in a cylindrical shape, is connected with a fixing angle 40 in the region of an elongated hole 39, wherein the two fixing angles 40, arranged on both sides of the busbars 27a to 27f, 28a to 28f and 29a to 29f are in turn connected via screw connections 41, 42 with the respective busbars 27-1 to 27-6, 28-1 to 28-6 and 29-1 to 29-6.

As can be seen in particular from FIG. 2, the busbars 27a to 27f, 28a to 28f and 29a to 29f respectively have a busbar housing 43, in which respectively the individual conductors 44 to 46, which consist in particular of aluminium and have a rectangular cross-section, are arranged. The conductors 44 to 46 are connected with one another in a force-fitting manner in the connection region of the busbars 27a to 27f, 28a to 28f and 29a to 29f by means of a transverse bolt 47 with interposition of isolators, which are not shown, in order to ensure the flow of current within the conductors 44 to 46.

For the repair or respectively replacement of individual busbars 27a to 27f, 28a to 28f and 29a to 29f it is expedient to respectively remove in addition all busbars 27a to 27f, 28a to 28f and 29a to 29f of a busbar subregion 27, 28, 29 above the busbar 27a to 27f, 28a to 28f and 29a to 29f which is respectively to be repaired or respectively replaced. For this, firstly in a first working step if applicable the connection bar 31 or respectively 32 arranged respectively above the busbar subregion 27 or respectively 28 must be removed.

Figure 3:
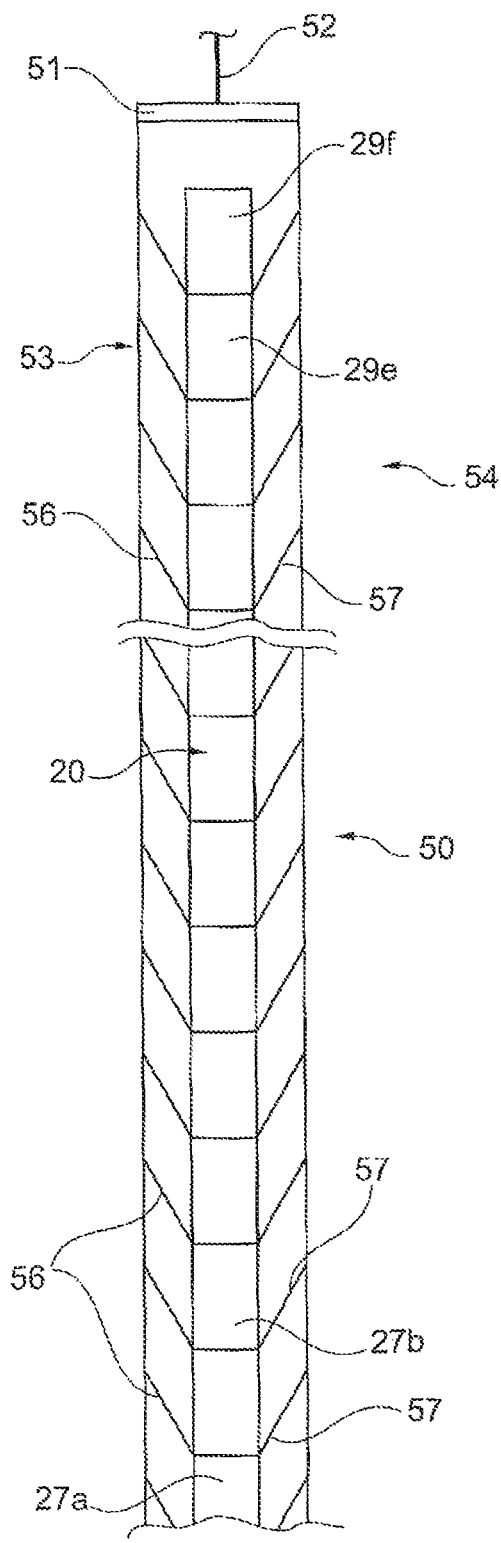

A device, illustrated in simplified form in FIGS. 2 and 3 with a first relief arrangement 50 serves to enable, during the repair or respectively replacement of a busbar 27a to 27f, 28a to 28f and 29a to 29f, a stress-free dismantling or respectively installation of the busbars 27a to 27f, 28a to 28f and 29a to 29f, unaffected by the weights of the busbars 27a to 27f, 28a to 28f and 29a to 29f transferred via the elastomer elements 38 into the busbar subregions 27 to 29.

The first relief arrangement 50 preferably serves here to arrange all busbars 27a to 27f, 28a to 28f and 29a to 29f at the same time at least partially in a weight-free manner, in order in particular to enable a low-stress, preferably stress-free overall alignment or respectively realignment of the busbars 27a to 27f, 28a to 28f and 29a to 29f within the tower 11. Preferably here at the same time the elastomer elements 38 of the fixing devices 35 can be replaced, so that any elastomer elements 38 previously damaged owing to stresses which occurred in the interim can not cause any breakdowns or respectively damage during the further operation.

For this, the first relief arrangement 50 has a crossbeam 51, which is fixed by means of a chain block 52, only indicated symbolically, in particular in the machine mount of the nacelle 13. A load chain 53, 54 is arranged respectively on both sides of the busbar interconnection 20 on the crossbeam 51. Two tensioning devices 56, 57, in particular in the form of turnbuckles 58, 59, are associated with each busbar 27a to 27f, 28a to 28f and 29a to 29f. Here, each of the turnbuckles 58, 59 is able to be connected with an elongated hole 39 of a fixing angle 40. The arrangement of the load chains 53, 54 is symmetrical to the longitudinal axis of the busbars 27a to 27f, 28a to 28f and 29a to 29f, so that any transverse forces introduced via the tensioning devices 56, 57 can be equalized.

The weight-free setting of the busbar interconnection 20 takes place such that beginning from the uppermost busbar 29f arranged in the tower 11, the busbars 29e to 29a, 28f to 28a and 27f to 27a are set weight-free in succession in the direction of the base 12 by means of the tensioning devices 56, 57. For this, the position of the individual busbars 27a to 27f, 28a to 28f and 29a to 29f or respectively of the fixing devices 35 is checked, until it is ensured that by means of the tensioning devices 56, 57 the weight of the respective busbar 27a to 27f, 28a to 27f and 29a to 29f is equalized or respectively compensated. As soon as this has taken place with all busbars 27a to 27f, 28a to 28f and 29a to 29f, the entire busbar interconnection 20 is free of stress, so that in particular the elastomer elements 38 on the individual busbars 27a to 27f, 28a to 28f and 29a to 29f can be replaced. After replacement of the elastomer elements 38, the individual busbars 27a to 27f, 28a to 28f and 29a to 29f are loaded again with their own weight in reverse sequence, i.e. from the direction of the base 12 in the direction of the nacelle 13, by the respectively tensioning devices 56, 57 being removed.

Figure 4:
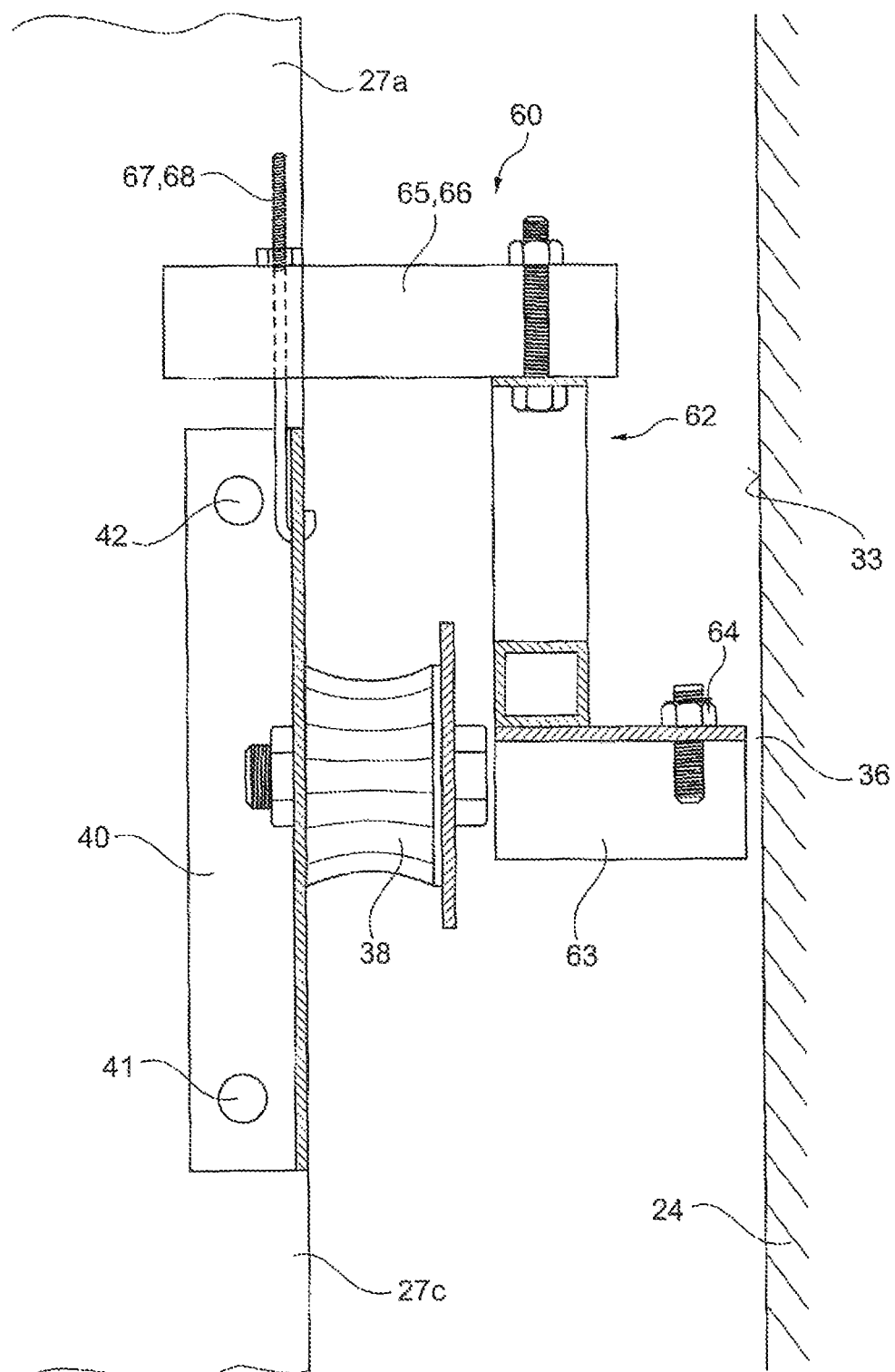
Figure 5:
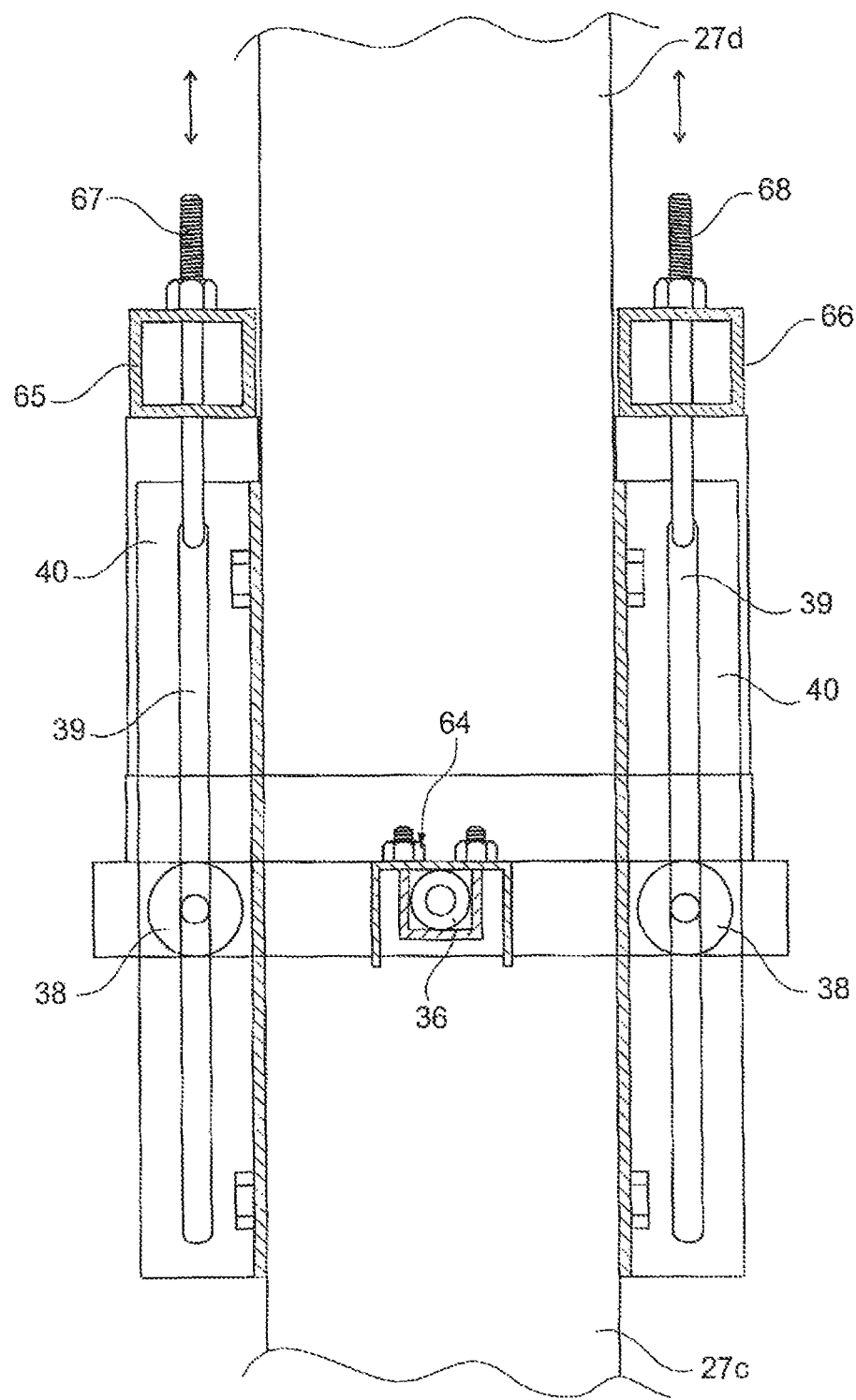

In FIGS. 4 and 5 a modified device is illustrated with a second relief arrangement 60. The second relief arrangement 60 serves to replace or respectively repair individual busbars 27a to 27f, 28a to 28f and 29a to 29f of a busbar subregion 27 to 29. For this, the second relief arrangement 60 has a supporting structure 62, which comprises for example a U-shaped carrier 63, which is able to be secured or respectively fixed on a bracket bolt 36. A tensioning device 64, having a tensioning bolt, serves for this. The supporting structure 62 has, in addition, two crossmembers 65, 66 arranged on both sides of the busbars 27a to 27f, 28a to 28f and 29a to 29f. A tension bolt 67, 68 is arranged so as to be axially adjustable respectively on the crossmembers 65, 66, which tension bolt engages into the respective elongated hole 39 of a fixing angle 40.

During the repair or respectively replacement of individual busbars 27a to 27f, 28a to 28f and 29a to 29f in a busbar subregion 27 to 29 generally several second relief arrangements 60 come into use simultaneously, which are connected with at least the busbar 27a to 27f, 28a to 28f and 29a to 29f directly above or respectively below that which is to be replaced or respectively repaired, via the respective fixing device 35, in order to set the respective busbar 27a to 27f, 28a to 28f and 29a to 29f at least partially, preferably completely free of weight. In particular, on reassembling the individual busbars 27a to 27f, 28a to 28f and 29a to 29f, the latter are respectively set in a force-free manner before the respectively next, upper busbar 27b to 27f, 28a to 28f or respectively 29a to 29f is mounted.

The relief arrangements 50 or respectively 60 described so far can be altered or respectively modified in a variety of ways, without departing from the idea of the invention. It is only essential that these are suitable for the at least partial, preferably for the entire weight-free setting of busbars 27a to 27f, 28a to 28f and 29a to 29f. It is mentioned in addition that the tower 11 can also have different dimensions than those described and illustrated. Thus, for example, it is possible that the tower 11 has a height of approximately 80 m and is constructed from more (or fewer) tower segments.

Furthermore, it is mentioned that the invention was described in the example embodiments by means of a replacement or respectively a repair of busbars 27a to 27f, 28a to 28f and 29a to 29f. However, it is also within the scope of the invention to use the relief arrangements 50, 60 for the first installation of the busbars 27a to 27f, 28a to 28f and 29a to 29f and, after their installation, to remove the relief arrangements 50, 60 from the wind power plant 10.

The invention claimed is:

1. A method for repairing and replacing busbars (27a to 27f, 28a to 28f, 29a to 29f) on erected, existing wind power plants (10), in which a power connection between a generator device (16) disposed in an upper region of the wind power plant (10) and a substation (22) located at a base area of the wind power plant (10) consists of a plurality of busbar subregions (27, 28, 29), each comprising a certain number of mutually interconnected busbars (27a to 27f, 28a to 28f, 29a to 29f), wherein the busbars (27a to 27f, 28a to 28f, 29a to 29f) are fixed by fixing devices (35) to an inner wall (13) of a tower (11) of the wind power plant (10) consisting of tubular segments (24 to 26) that are arranged on top of one another, wherein the busbar subregions (27, 28, 29) are connected in an electrically conductive manner by means of connection bars (31, 32), which respectively connects an upper busbar (27f, 28f) of a lower busbar subregion (27, 28) with a lower busbar (28a, 29a) of an upper busbar subregion (28, 29), wherein the busbar (27a to 27f, 28a to 28f, 29a to 29f) which is to be handled is exposed and if applicable removed from its respective busbar subregion (27, 28, 29) by removing of the busbars (27a to 27f, 28a to 28f, 29a to 29f), arranged above it, of its busbar subregion (27, 28, 29) and of the associated connection bar (31, 32), and wherein after the repair or the replacement of the busbar subregion (27, 28, 29) is produced again by inserting the removed busbars (27a to 27f, 28a to 28f, 29a to 29f) in reverse sequence, the method comprising the step of:

at least partially offsetting the weight of at least one busbar (27a to 27f, 28a to 28f, 29a to 29f) arranged directly above or below the busbar (27a to 27f, 28a to 28f, 29a to 29f) that is to be repaired or replaced by means of a relief arrangement (50; 60) by applying a tensile force to the relevant busbar (27a to 27f, 28a to 28f, 29a to 29f).

2. The method according to claim 1, including providing at least one elastic fixing element (38) associated with a fixing device (35) of the busbar (27a to 27f, 28a to 28f, 29a to 29f)

which is to be repaired or replaced which is replaced together with the relevant busbar (27*a* to 27*f*, 28*a* to 28*f*, 29*a* to 29*f*).

3. The method according to claim 1, including equalizing the weights of the busbars (27*a* to 27*f*, 28*a* to 28*f*, 29*a* to 29*f*) by relieving the busbars (27*a* to 27*f*, 28*a* to 28*f*, 29*a* to 29*f*) from the direction of the generator device (16) in the direction of the substation (22), by the weights of the busbars (27*a* to 27*f*, 28*a* to 28*f*, 29*a* to 29*f*) being equalized in succession, and that after completion of the repair or respectively of the replacement of the busbar (27*a* to 27*f*, 28*a* to 28*f*, 29*a* to 29*f*) the weight loading of the busbars (27*a* to 27*f*, 28*a* to 28*f*, 29*a* to 29*f*) as a result of their inherent weight takes place from the direction of the substation (22) in the direction of the generator device (16), by the busbars (27*a* to 27*f*, 28*a* to 28*f*, 29*a* to 29*f*) being brought out of operative connection in succession with the relief arrangement (50; 60).

4. The method according to claim 1, including equalizing at least partially the weights of all busbars (27*a* to 27*f*, 28*a* to 28*f*, 29*a* to 29*f*) of a busbar subregion (27, 28, 29) in which the busbar (27*a* to 27*f*, 28*a* to 28*f*, 29*a* to 29*f*) which is to be repaired or replaced is situated by means of the relief arrangement (50; 60).

5. The method according to claim 4, including equalizing at least partially also the weights of those busbars (27*a* to 27*f*, 28*a* to 28*f*, 29*a* to 29*f*) of the busbar subregions (27, 28, 29) which are situated beneath or respectively above the busbar subregion (27, 28, 29) with the busbar (27*a* to 27*f*, 28*a* to 28*f*, 29*a* to 29*f*) which is to be repaired or replaced.

6. A device for carrying out a method according to claim 1, wherein a relief arrangement (50; 60) which is connected with the fixing device (35) of the busbar (27*a* to 27*f*, 28*a* to 28*f*, 29*a* to 29*f*) and which has at least one tensioning device (56, 57), by which the weight of the busbar (27*a* to 27*f*, 28*a* to 28*f*, 29*a* to 29*f*) is able to be offset by applying a tensile force to the busbar (27*a* to 27*f*, 28*a* to 28*f*, 29*a* to 29*f*).

7. The device according to claim 6, wherein the relief arrangement (60) is fixed on a fixing bolt (36) for fixing the fixing device (35) for the busbar (27*a* to 27*f*, 28*a* to 28*f*, 29*a* to 29*f*).

8. The device according to claim 6, wherein the relief arrangement (50) has at least one carrying means (53, 54), which is able to be secured on an upper region of the tower (11) or of the generator device (16) of the wind power plant (10), and the at least one carrying means (53, 54) for a plurality of busbars (27*a* to 27*f*, 28*a* to 28*a*, 29*a* to 29*f*), preferably for all busbars (27*a* to 27*f*, 28*a* to 28*f*, 29*a* to 29*f*), has at least one tensioning device (56, 57) for weight equalization, which is able to be connected with the fixing device (35) of the respective busbar (27*a* to 27*f*, 28*a* to 28*f*, 29*a* to 29*f*).

9. The device according to claim 8, wherein the relief arrangement (50; 60) for each busbar (27*a* to 27*f*, 28*a* to 28*f*, 29*a* to 29*f*) has two tensioning devices (56, 57) able to be connected with the fixing device (35), and that the two tensioning devices (56, 57) are arranged symmetrically to the longitudinal axis of the busbar (27*a* to 27*f*, 28*a* to 28*f*, 29*a* to 29*f*).

\* \* \* \* \*